E. C. GUNUSKEY.
NOZZLE FOR SAUSAGE STUFFING MACHINES.
APPLICATION FILED APR. 23, 1910.
990,547.
Patented Apr. 25, 1911.
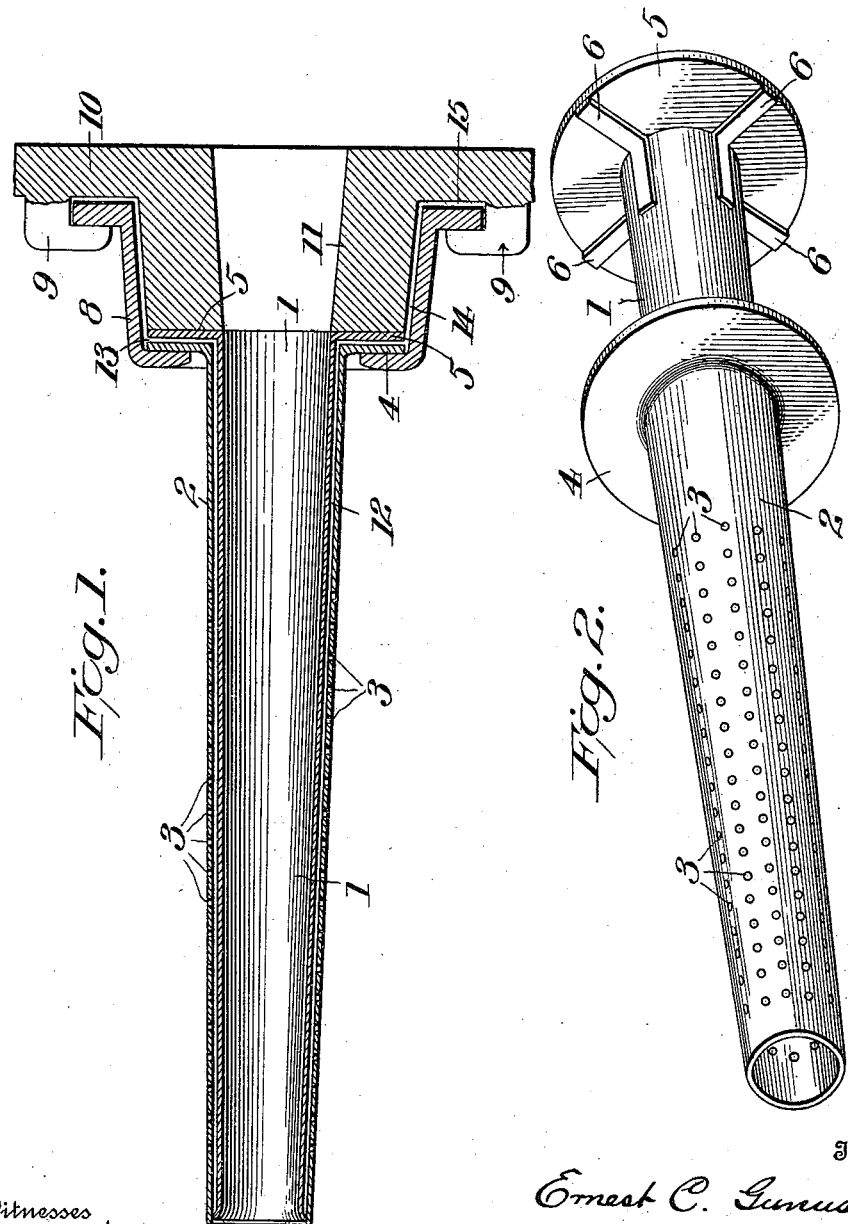
Witnesses
Inventor
Ernest C. Gunuskey,
By Watson & Boyden
Attorneys

UNITED STATES PATENT OFFICE.

ERNEST C. GUNUSKEY, OF SCRANTON, PENNSYLVANIA.

NOZZLE FOR SAUSAGE-STUFFING MACHINES.

990,547.

Specification of Letters Patent. Patented Apr. 25, 1911.

Application filed April 23, 1910. Serial No. 557,253.

*To all whom it may concern:*

Be it known that I, ERNEST C. GUNUSKEY, a citizen of the United States, residing at Scranton, in the county of Lackawanna and State of Pennsylvania, have invented certain new and useful Improvements in Nozzles for Sausage-Stuffing Machines, of which the following is a specification.

My invention relates to nozzles for sausage stuffing machines, and its object is to provide a nozzle which will permit a ready escape of air from the sausage casing. Unless provision is made for the escape of such air it tends to accumulate in the casing as the meat is forced therein, and frequently results in bursting the casing.

With the above object in view, and to provide a nozzle which shall be effective in operation and comparatively cheap to manufacture, and which may be fitted to various types of existing machines, my invention consists in the construction and arrangement of parts hereinafter described, claimed, and illustrated in the accompanying drawing, in which, Figure 1 is a central longitudinal section through my improved nozzle, showing the clamping means employed to hold it in position; and, Fig. 2 is a perspective view of the nozzle itself, the parts thereof being separated.

Referring to the drawings in detail, my improved nozzle comprises an inner tube 1 and an outer tube 2 which are preferably slightly tapering and which are concentrically arranged, as clearly shown in Fig. 1. The inner tube 1 is solid, while the outer tube 2 is provided almost throughout its length with a series of perforations 3. The outer and inner tubes are provided at their inner ends with parallel annular flanges 4, and 5, respectively. These flanges are spaced apart by means of spacing blocks 6 secured to one of the flanges, which blocks extend also along the inner tube so as to space the tubes apart at the end adjacent the flanges. At the outer end, the tubes are spaced apart by means of flaring or expanding the end of the inner tube, as indicated at 7 in Fig. 1.

The two tubes constituting the nozzle are adapted to be clamped in position as shown in Fig. 1, by means of a clamping ring 8 which engages the flange 4, and which is itself provided with a cam flange adapted to engage under suitable lugs 9, carried by the head 10 of the sausage machine cylinder. This head has a hollow projecting boss 11 against which the flange 5 of the inner tube is pressed, so as to form a tight joint.

The casing to be filled is slipped over the outer tube 2 in the well known manner, and the meat enters the casing through the inner tube 1. The air in the casing passes through the perforations 3 into the annular passage 12 between the tubes, thence through the passage 13 between the flanges, thence through the passages 14 and 15 formed between the cylinder head and the clamping ring, whence it escapes.

It will thus be seen that with my improved construction I have provided tight joints at all points past which the meat is forced, but at the same time, I have formed an open air passage or channel through which the air in the casing may escape to the atmosphere, and it is thought that the numerous advantages of my invention will be readily appreciated by those skilled in the art.

What I claim is:—

1. A nozzle for sausage stuffing machines comprising a pair of concentrically arranged tubes spaced apart so as to preserve an air passage therebetween, and means for rigidly maintaining said tubes in such concentric, spaced relation.

2. A nozzle for sausage stuffing machines comprising an outer perforated tube adapted to receive the sausage casing, and an inner imperforate tube concentric therewith, said tubes being spaced apart to form an air passage therebetween, and means at each end of said tubes for preserving such spaced relation.

3. A nozzle for sausage stuffing machines comprising an outer perforated tube over which the sausage casing is adapted to be slipped, and an inner imperforate tube through which the meat is fed, said tubes being concentrically arranged and provided at their inner ends with parallel annular flanges, such flanges being adapted to engage a clamping device for securing the nozzle in position, said tubes and said flanges being spaced apart to provide an air passage therebetween.

4. A nozzle for sausage stuffing machines comprising an outer tube over which the sausage casing is adapted to be slipped, and an inner tube through which the meat is fed, spacing means between the inner ends of said tubes, and the outer end of said inner tube being slightly flared in such manner as to engage the inner wall of the outer tube, such flared end coöperating with said spacing means to maintain the two tubes in concentric spaced relation.

In testimony whereof I affix my signature, in presence of two witnesses.

ERNEST C. GUNUSKEY.

Witnesses:
GERTRUDE P. MORRIS,
A. P. CLARK.

Copies of this patent may be obtained for five cents each, by addressing the "Commissioner of Patents, Washington, D. C."